United States Patent [19]

Hirota et al.

[11] Patent Number: 4,476,501

[45] Date of Patent: Oct. 9, 1984

[54] AUDIO SIGNAL RECORDING AND/OR REPRODUCING SYSTEM FOR ELIMINATING AUDIO CROSSTALK

[75] Inventors: Akira Hirota, Chigasaki; Yoshihiko Ota, Yokohama, both of Japan

[73] Assignee: Victor Company of Japan, Ltd., Yokohama, Japan

[21] Appl. No.: 356,484

[22] Filed: Mar. 9, 1982

[30] Foreign Application Priority Data

Mar. 12, 1981 [JP] Japan .................. 56-35569

[51] Int. Cl.³ ........................................... H04N 5/782
[52] U.S. Cl. .................. 360/19.1; 358/328; 358/343
[58] Field of Search ............... 358/310, 328, 330, 343; 360/9.1, 8, 19.1, 22, 23, 33.1, 61, 64, 18, 20, 21

[56] References Cited

U.S. PATENT DOCUMENTS 4,303,950 12/1981 Taniguchi et al. ............... 360/19.1
4,390,906 6/1983 Furumoto et al. ............... 360/19.1

FOREIGN PATENT DOCUMENTS

55-163613 12/1980 Japan ............... 360/19.1

Primary Examiner—Donald E. McElheny, Jr.
Attorney, Agent, or Firm—Louis Bernat

[57] ABSTRACT

An audio signal recording and reproducing system in an apparatus for recording and reproducing a video signal with respect to a recording medium by one or a plurality of rotary heads, comprises a first delay circuit for delaying an input recording audio signal by a predetermined time interval, a multiplexing circuit for multiplexing a non-delayed signal which is the input recording audio signal and an output delayed audio signal of the first delay circuit, to obtain a multiplexed audio signal for recording, a recording and reproducing circuit for multiplexing the video signal and the multiplexed audio signal for recording thus obtained, to perform recording and reproduction of the multiplexed signal with respect to the recording medium by the one or a plurality of rotary heads, a reproduced video signal obtaining circuit for separating the video signal from a signal reproduced by the recording and reproducing circuit, to obtain a reproduced video signal, a separating circuit for separating the non-delayed audio signal and the delayed audio signal of the multiplexed audio signal from the signal reproduced by the recording and reproducing circuit, a second delay circuit for delaying the separated non-delayed audio signal by a delay time equal to the delay time of the first delay circuit, and a switching circuit for alternately switching the separated delayed audio signal and an output delayed audio signal of the second delay circuit, to produce a continuous reproduced audio signal.

8 Claims, 12 Drawing Figures

AUDIO SIGNAL RECORDING AND/OR REPRODUCING SYSTEM FOR ELIMINATING AUDIO CROSSTALK

BACKGROUND OF THE INVENTION

The present invention generally relates to systems for recording and/or reproducing an audio signal together with a video signal in video signal recording and/or reproducing apparatus. More particularly, to a recording and/or reproducing system produces a multiplexed audio signal by multiplexing a delayed audio signal and a non-delayed audio signal. This multiplexed audio signal is recorded together with a video signal in the recording system. The non-delayed audio signal of the reproduced multiplexed audio signal is delayed, to obtain a continuously reproduced audio signal by switching this delayed signal and the reproduced delayed audio signal in the reproducing system.

Conventionally, a pair of rotary heads record a video signal onto and from a magnetic tape in video tracks which are formed obliquely with respect to the longitudinal direction of the tape. A fixed head recorded the audio signal onto and reproduced from an audio track which is formed exclusively for the audio signal along the edge of the magnetic tape. However, in this conventional system, the audio track part on the magnetic tape is exclusively for the audio signal, and other signals are not recorded in this audio track part. Accordingly, there was a disadvantage in that the utilization efficiency of the magnetic tape was low in this system. Furthermore, it was necessary to provide an audio head exclusively for recording and reproducing the audio signal. These disadvantages become serious problems when an attempt is made to improve the recording and reproducing utilization efficiency of the magnetic surface of the magnetic tape. Also, miniaturization of the magnetic recording and reproducing apparatus is desirable by simplifying the mechanisms and reducing the number of parts required in the magnetic recording and reproducing apparatus.

Hence, the present inventors have realized a system in which the audio signal is multiplexed with the video signal and recorded on the oblique tracks on the magnetic tape by the rotary heads, to eliminate the need for the audio track exclusively for the audio signal. In this system, it becomes unnecessary to provide the audio track, and the utilization efficiency of the magnetic tape is improved. Further the audio head also becomes unnecessary.

However, to a small extent, the crosstalk introduced between audio signals recorded in adjacent tracks becomes a problem in this system. Moreover, in a recording and reproducing apparatus which performs recording and reproduction by a single rotary head, signal dropout is generally introduced when the head traces the end edge of the tape. Therefore, if the above system is applied to a one head system recording and reproducing apparatus, signal dropout will also occur in the audio signal. This will result in an interruption of the reproduced sound.

SUMMARY OF THE INVENTION

Accordingly, it is a general object of the present invention to provide a novel and useful audio signal recording and/or reproducing system in a video signal recording and/or reproducing apparatus, in which the above described disadvantages have been overcome.

Another and more specific object of the present invention is to provide an audio signal recording and/or reproducing system in an apparatus for recording and/or reproduction a video signal by one or a plurality of rotary heads. A multiplexed audio signal is obtained by multiplexing a delayed audio signal and a non-delayed audio signal. This this multiplexed audio signal is recorded together with a video signal. On reproduction, the non-delayed audio signal of the multiplexed audio signal is delayed, to obtain a continuously reproduced audio signal by switching between this delayed signal and the audio signal which is delayed in the reproducing system.

Still another object of the present invention is to provide an audio signal recording and/or reproducing system for use in a video recording and/or reproducing apparatus. A pair of rotary heads record the video signal on a recording medium in which the multiplexed audio signal is recorded on every second track in the recording system. A continuously reproduced audio signal is obtained from the multiplexed audio signal thus recorded and reproduced in the reproducing system.

Another object of the present invention is to provide an audio signal recording and/or reproducing system for recording and/or reproducing a video signal with respect to a magnetic tape, the recording being made by a single rotary head. The multiplexed audio signal is recorded on each track in the recording system. A continuously reproduced audio signal is obtained by correcting signal dropouts inevitably introduced when the single rotary head traces an end edge of the magnetic tape in the reproducing system.

Other objects and further features of the present invention will be apparent from the following detailed description when read in conjunction with the accompanying drawings.

BRIEF DESCRIPTION OF THE DRAWINGS

FIGS. 4(A) through 4(J) respectively show signals at each part of the block diagram shown in FIGS. 1 and 2, for explaining positions of these signals on the time base;

FIGS. 9(A) through 9(L) respectively show signals at each part of the block systems shown in FIGS. 5 and 6, for explaining positions of these signals on the time base;

FIGS. 12(A) through 12(J) respectively show signals at each part of the block systems shown in FIGS. 8 and 9, for explaining positions of these signals on the time base.

DETAILED DESCRIPTION

Figure 1:
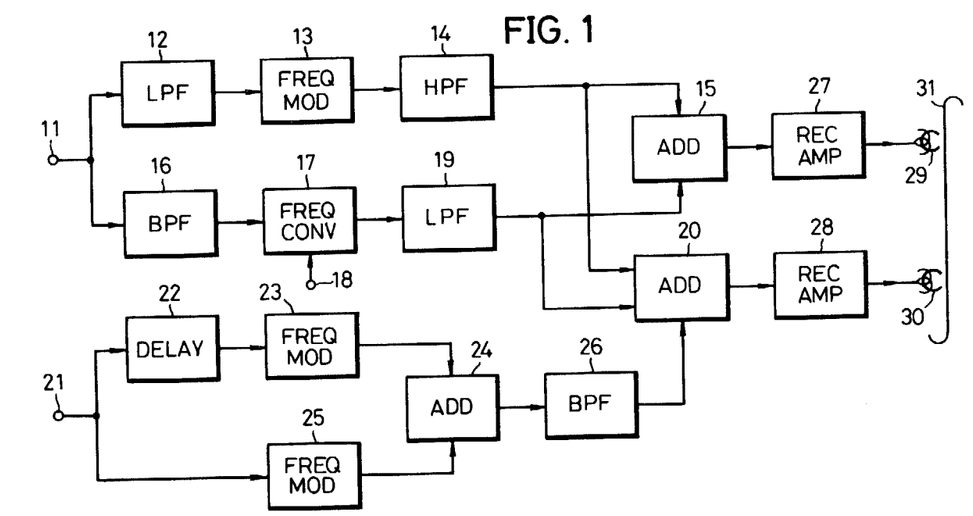
FIGS. 1 and 2 are systematic block diagrams respectively showing a recording system and a reproducing system of a first embodiment of a recording and reproducing system according to the present invention.
Figure 3:
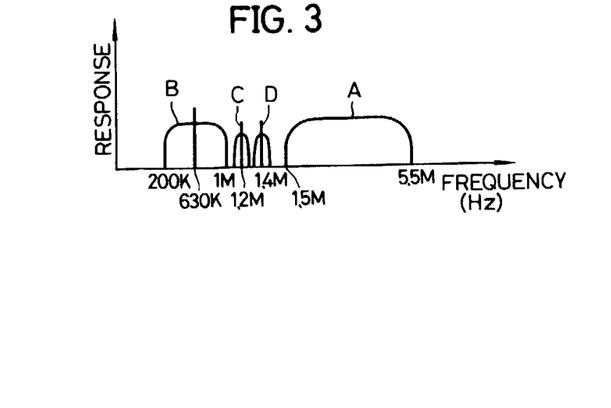
FIG. 3 shows a frequency spectrum of a signal recorded by the recording system shown in FIG. 1.
Figure 4:
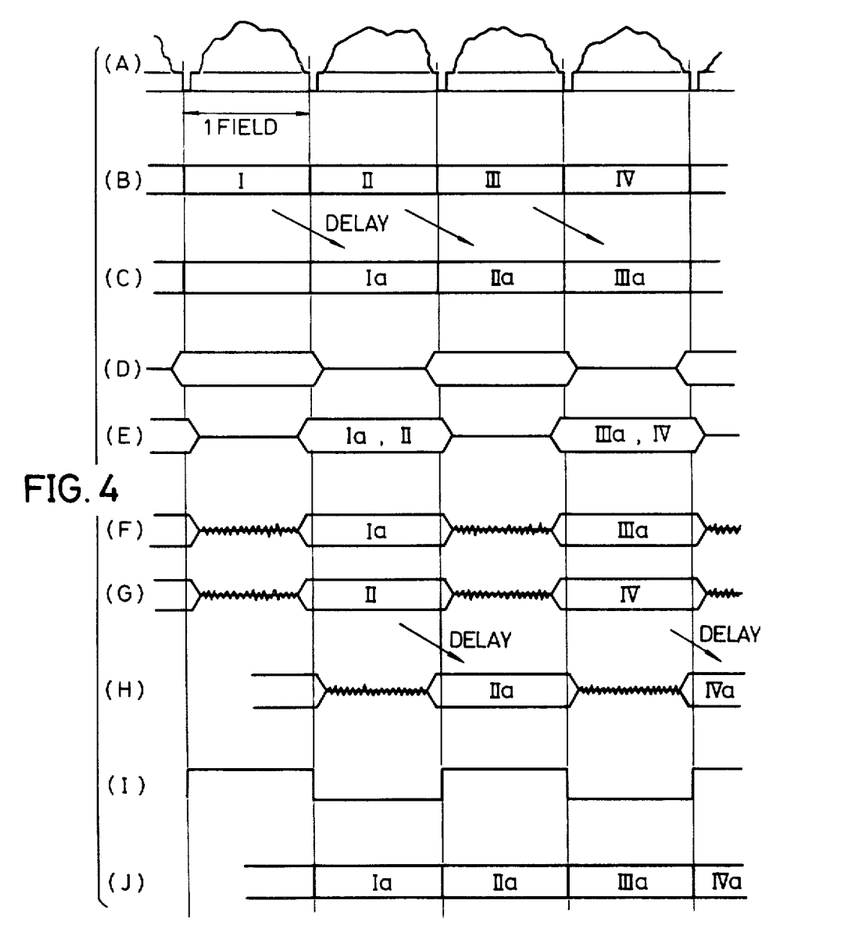

First, a description will be given with respect to an embodiment of a recording and reproducing system according to the present invention, by referring to FIG. 1. A color video signal indicated in FIG. 4(A) is applied to an input terminal 11, and is supplied to a lowpass filter 12 and a bandpass filter 16. The lowpass filter 12 passes signals having frequencies under 3 MHz, while the bandpass filter 16 passes signals in a band between 3 MHZ and 4 MHz. A luminance signal within the input color video signal is obtained at the lowpass filter 12, and supplied to a frequency modulator 13 wherein a carrier is frequency-modulated. Unwanted frequency components are eliminated from a frequency-modulated output luminance signal (FM luminance signal) of the frequency modulator 13, at a highpass filter 14 which passes signals having frequencies over 1.5 MHz. Accordingly, a signal having a frequency spectrum indicated by A in FIG. 3, is supplied to an adding circuits 15 and 20. A carrier chrominance signal within the input color video signal is obtained at the bandpass filter 16, and supplied to a frequency converter 17. This carrier chrominance signal is frequency-converted into a low band by a frequency converting signal supplied from a terminal 18. Unwanted frequency components are eliminated from an output frequency-converted carrier chrominance signal thus obtained, at a lowpass filter 19 which passes signals having frequencies under 1 MHz. Hence, a signal having a frequency spectrum indicated by B in FIG. 3 is supplied to the adding circuits 15 and 20.

On the other hand, an audio signal is supplied to a one-field delay circuit 22 and a frequency modulator 25, through an input terminal 21. The delay circuit 22 comprises delay elements such as bucket brigade devices (BBDs) and the like, which delay the audio signal by an interval corresponding to one field of the video signal (1/60 seconds, that is, approximately 16.7 miliseconds). If the input audio signal from the terminal 21 is designated by reference characters I, II, III, IV, ... for every one field as indicated in FIG. 4(B), an output signal of the delay circuit 22 becomes a signal designated by reference characters Ia, IIa, IIIa, ... as indicated in FIG. 4(C). Here, the signal indicated by a reference character with a subscript "a" is a signal obtained by delaying the same signal in each field interval by one field interval.

The output signals Ia, IIa, IIIa, ... of the delay circuit 22 are supplied to a frequency modulator 23, to frequency-modulate a carrier having a frequency of 1.2 MHz. Accordingly, a frequency-modulated delayed audio signal (FM delayed audio signal) indicated by C in FIG. 3 is obtained, wherein the FM delayed audio signal has a frequency deviation of ±25 kHz about a frequency of 1.2 MHz. This FM delayed audio signal is supplied to an adding circuit 24. The audio signals I, II, III, ... are supplied to the frequency modulator 25, from the input terminal 21, and then frequency-modulate a carrier having a frequency of 1.4 MHz. As a result, a frequency-modulated audio signal (FM audio signal) is obtained, as indicated by D in FIG. 3 which has a frequency deviation of ±25 kHz about a frequency of 1.4 MHz, and is supplied to the adding circuit 24. The above FM delayed audio signal and the FM audio signal are added and multiplexed at the adding circuit 24. Unwanted frequency components are eliminated from this added and multiplexed signal at a bandpass filter 26 having a filtering band between 1 MHz and 1.5 MHz, and then is supplied to the adding circuit 20.

Adding circuit 15 adds the FM luminance signal and the frequency-converted carrier chrominance signal, from the filters 14 and 19 respectively having the frequency spectrums indicated by A and B in FIG. 3. The added signal is recorded onto a magnetic tape 31 by a rotary head 29 for a first channel, through a recording amplifier 27. The above signals from the filters 14 and 19 are also supplied to the adding circuit 20 wherein these signals are added with the signal from the filter 26. The FM delayed audio signal and the FM audio signal respectively have the frequency spectrums indicated by C and D in FIG. 3, which are obtained from the filter 26 after being added and multiplexed, respectively exist between the above frequency spectrums A and B. The band of each signal will not overlap with the band of another signal. An output signal of the adding circuit 20 is recorded onto the magnetic tape 31 by a rotary head 30 for a second channel, through a recording amplifier 28. The above rotary heads 29 and 30 are provided at positions opposing each other, at diametrical opposed positions on a rotary body such as a rotary drum. These heads 29 and 30 alternately record on oblique and mutually adjacent tracks on the magnetic tape 31, in a state where the magnetic tape 31 makes an oblique contact with the guide drum throughout an angular range slightly larger than 180°.

An interval recorded by the head 29 is indicated in FIG. 4(D) while an interval recorded by the head 30 is indicated in FIG. 4(E). Since the magnetic tape 31 is wound around the guide drum throughout the angular range slightly larger than 180° as described above, an interval exists wherein recording is simultaneously performed by the heads 29 and 30 (overlap interval). As clearly seen by comparing FIGS. 4(D) and 4(E), the interval wherein the recording interval overlap timewise, is the above overlap interval. The heads 29 and 30 have gaps with mutually opposite azimuth angles. Accordingly even when the heads 29 and 30 respectively scan over the tracks recorded by the heads 30 and 29 (so-called reverse tracking), the track recorded by the other head will hardly be reproduced due to azimuth loss. Hence, it will be unnecessary to provide a guard band between each track and the tape utilization efficiency is improved.

As described above, the heads 29 and 30 alternately record on oblique tracks with respect to a longitudinal direction of the magnetic tape 31. Thus, the tracks recorded by the head 29 are mutually adjacent to the tracks recorded by the head 30. The tracks recorded with the FM audio signal and the FM delayed audio signal (that is, the tracks recorded by the head 30), are always adjacent to the track wherein these signals are not recorded (that is, the tracks recorded by the head 29). Therefore, with respect to the audio signal, cross talk will not be introduced between adjacent tracks.

Figure 2:
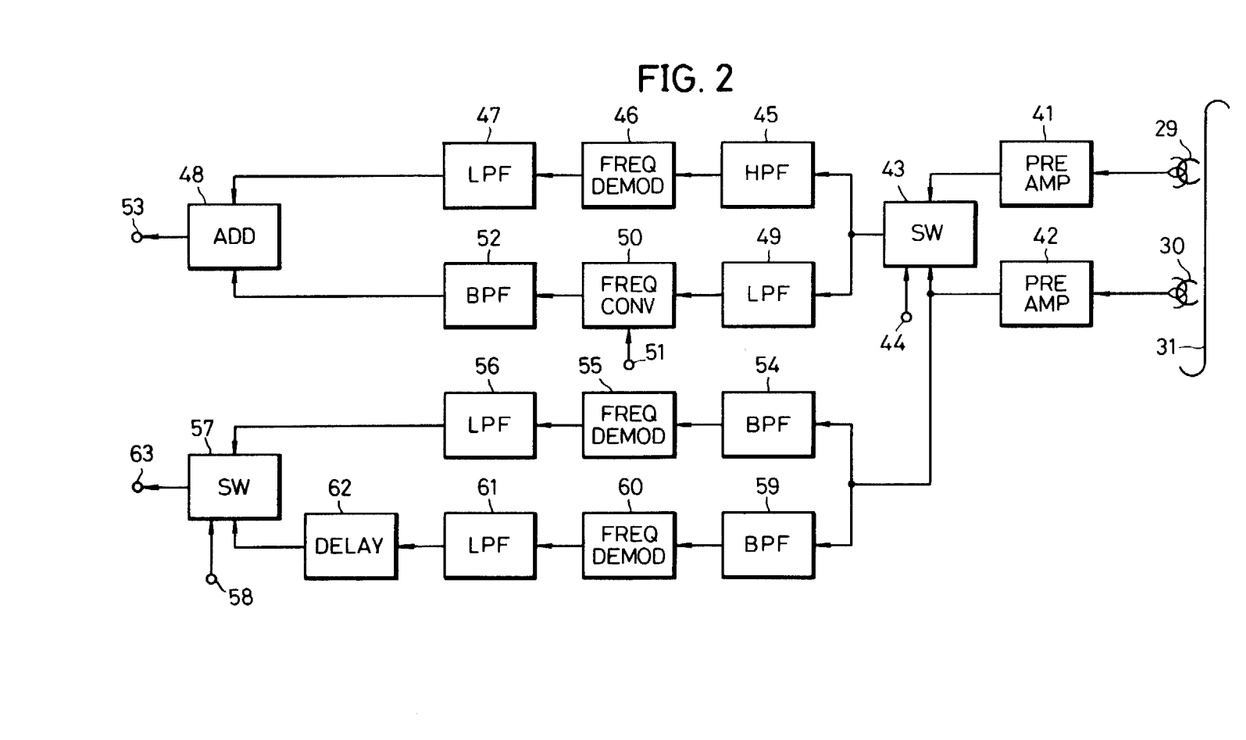

A description will now be given with respect to a reproducing system for reproducing the magnetic tape 31 recorded in the above described manner, by referring to FIG. 2.

Signals which are alternately reproduced from the magnetic tape 31 by the heads 29 and 30, are respectively supplied to a switcher 43, through preamplifiers 41 and 42. As is well known, the heads 29 and 30 are controlled by a control signal recorded on the magnetic tape 31 so that the heads 29 and 30 respectively scan over the tracks recorded by these heads 29 and 30 without introducing the above reverse tracking. The signals alternately supplied to the switcher 43 are switched by a switching signal having a period of one field and applied to the switcher 43 through a terminal 44. The signals alternately supplied to the switcher 43 is thus formed into a continuous signal.

An output signal of the switcher 43 is supplied to a highpass filter 45 and a lowpass fiter 49. The highpass filter 45 has a filtering characteristic for passing signals having frequencies over 1.5 MHz, and the FM luminance signal having the frequency spectrum A is obtained at this highpass filter 45. This FM luminance signal, is demodulated at a frequency demodulator 46. Unwanted frequency components are eliminated from the luminance signal of the frequency demodulator 46, at a lowpass filter 47 which passes signals having frequencies under 3 MHz, and then supplied to an adding circuit 48. The lowpass filter 49 has a filtering characteristic for passing signals having frequencies under 1 MHz. The frequency-converted carrier chrominance signal having the frequency spectrum B is obtained at this lowpass filter 49. An output signal of the lowpass filter 49 is supplied to a frequency converter 50 wherein the signal is frequency-converted by a frequency converting signal supplied to the frequency converter 50 through a terminal 51, and converted back into the carrier chrominance signal in the original band. Unwanted frequency components are eliminated from an output carrier chrominance signal of the frequency converter 50 at a bandpass filter 52 which passes signals in a band between 3 MHz and 4 MHz, and then supplied to the adding circuit 48. The luminance signal and the carrier chrominance signal are added in the adding circuit 48. As a result, a reproduced color video signal is obtained from an output terminal 53.

On the other hand, the reproduced signal from the rotary head 31 for the second channel which is obtained through the preamplifier 42, and is also supplied to bandpass filters 54 and 59. The bandpass filter 54 has a filtering characteristic for passing signals in a band of 1.2 MHz±25 kHz. The FM delayed audio signal having the frequency spectrum C is obtained at this bandpass filter 54. This FM delayed audio signal is demodulated at a frequency demodulator 55, and formed into delayed signal Ia, IIIa, . . . indicated in FIG. 4(F) which exists for every second field. Unwanted frequencies are eliminated from a delayed audio output signal of the frequency demodulator 55 at a lowpass filter 56 which passes signals having frequencies under 15 kHz, and then is supplied to a switcher 57.

The bandpass filter 59 has a filtering characteristic for passing signals in a band of 1.4 MHZ±25 kHz. The FM audio signal having the frequency spectrum D is obtained at this bandpass filter 59. This FM audio signal is demodulated at a frequency demodulator 60, and formed into an audio signal indicated in FIG. 4(G). Unwanted frequency components are eliminated from this output audio signal at a lowpass filter 61 which passes signals having frequencies under 15 kHz, and is supplied to an one-field delay circuit 62 wherein the signal is delayed by an interval of one field. Accordingly, as indicated in FIG. 4(H), the delayed audio signals IIa, IVa, . . . obtained by delaying the audio signals II, IV, . . . indicated in FIG. 4(G) by an interval of one field, are obtained for every second field from the delay circuit 62. This delayed audio signal is supplied to the switcher 57.

The switcher 57 is controlled by a switching signal indicated in FIG. 4(I) which reverses polarity for every one field period, through a terminal 58. The switcher 57 thus performs a switching operation to alternately produce the delayed audio signals Ia, IIIa, . . . indicated in FIG. 4(F) from the lowpass filter 56, and the delayed signals IIa, IVa, . . . indicated in FIG. 4(H) from the delay circuit 62, for every one field period. Accordingly, continuously delayed audio signals Ia, IIa, IIIa, IVa, . . . indicated in FIG. 4(J) are thus obtained from an output terminal 63 as a reproduced audio signal. The above reproduced audio signal obtained from the output terminal 63 is delayed by an interval of one field (1/60 seconds) with respect to the reproduced color video signal obtained from the output terminal 53. However, a delay to this extent does not become a problem from the auditory point of view, and no inconveniences are introduced.

Figure 5:
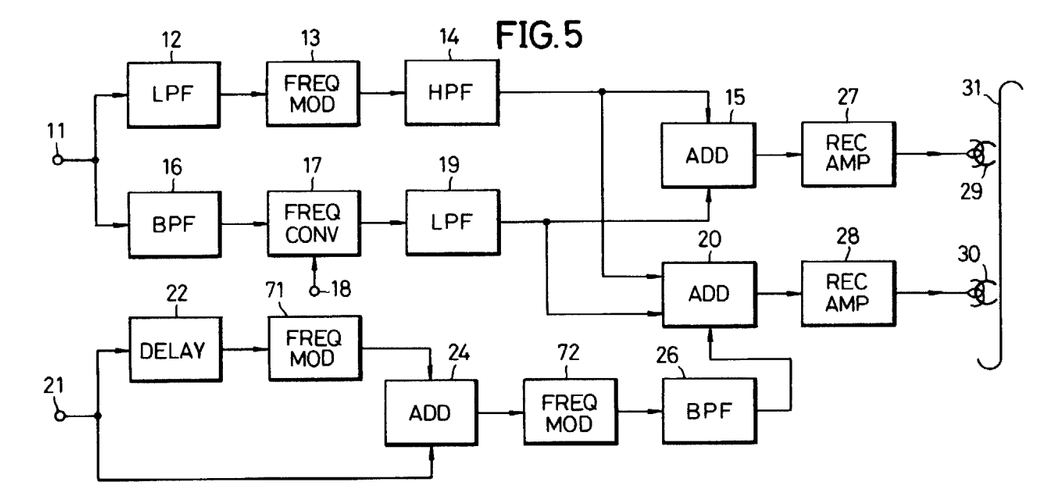
FIGS. 5 and 6 are systematic block diagrams respectively showing a recording system and a reproducing system of a second embodiment of a recording and reproducing system according to the present invention.

Next, a description will be given with respect to a recording system of a second embodiment of a recording and reproducing system according to the present invention, by referring to FIG. 5. In FIG. 5, those parts which are the same as those corresponding parts in FIG. 1 are designated by the same reference numerals, and their description will be omitted. A recording system for an input color video signal indicated in FIG. 9(A) is the same as in the above first embodiment of the invention, and the description of this recording system for the color video signal will be omitted.

Figure 9:
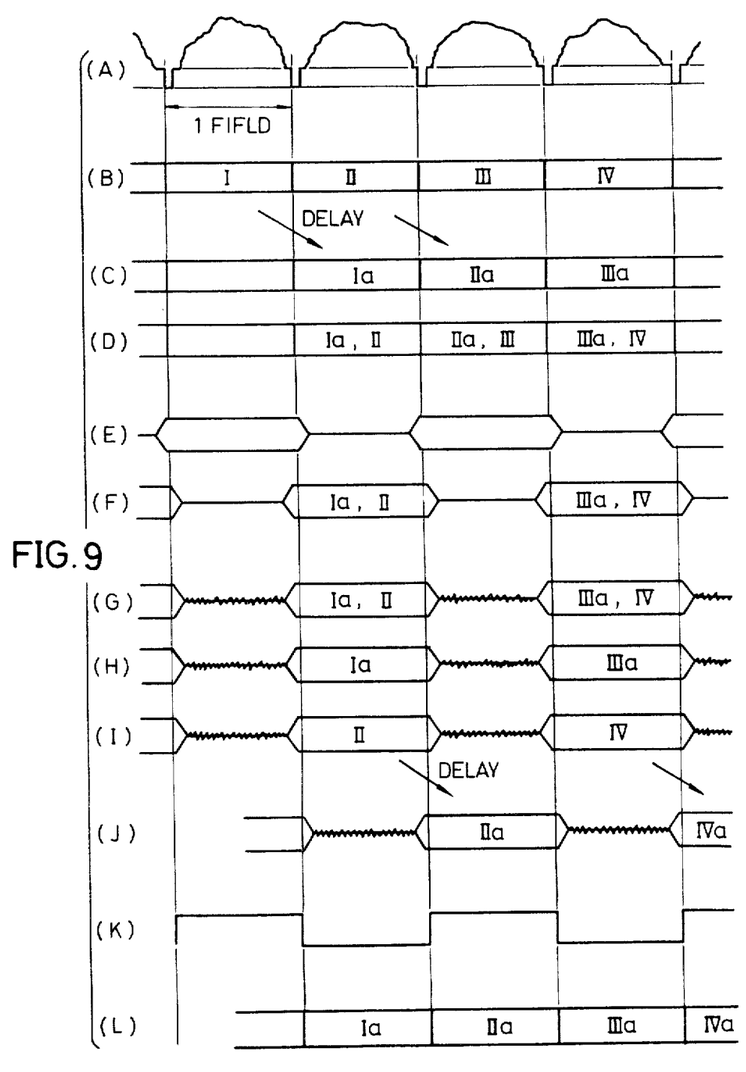

An audio signal I, II, III, . . . indicated in FIG. 9(B) is obtained from the input terminal 9(B), is delayed by an interval of one field by the one field delay circuit 22 as in the above first embodiment of the invention, and is converted into a delayed audio signal Ia, IIa, IIIa, . . . indicated in FIG. 9(C). This delayed audio signal is supplied to a frequency modulator 71 to frequency-modulate a carrier of 30 kHz, and then is supplied to the adding circuit 24 after being converted into an FM delayed audio signal having a frequency deviation of ±10 kHz about a frequency of 30 kHz. On the other hand, the audio signal from the input terminal 21 is directly supplied to the adding circuit 24, where it is added and multiplexed with the above FM delayed audio signal to be formed into a signal indicated in FIG. 9(D). The above FM delayed audio signal has a frequency spectrum indicated by E in FIG. 7, and the audio signal from the input terminal 21 has a frequency spectrum indicated by F in FIG. 7.

Figure 7:
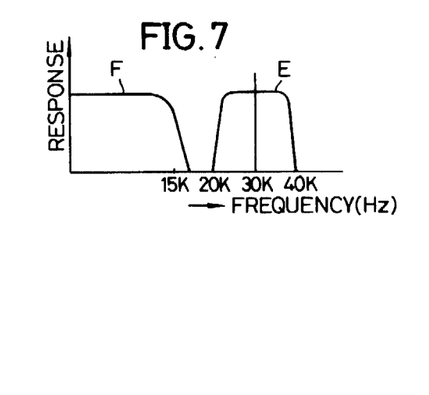
FIGS. 7 and 8 respectively show frequency spectrums of signals at each part of the block system shown in FIG. 5.

The multiplexed audio signal of the frequency spectrums indicated by E and F in FIG. 7, which is obtained from the adding circuit 24, is supplied to a frequency modulator 72. The above multiplexed audio signal frequency-modulates a carrier having a frequency of 1.25 MHz, and is formed into an FM multiplexed audio signal having a frequency deviation of ±25 kHz about a frequency of 1.25 MHz. An output FM multiplexed audio signal from the frequency modulator 72 has a frequency spectrum indicated by G in FIG. 8. This FM multiplexed audio signal passes through the bandpass filter 26, the adding circuit 20, and the recording amplifier 28, and is recorded by the head 30 for the second channel together with the video signal for every second track. As shown in FIGS. 9(E) and 9(F), the recording intervals of the heads 29 and 30 are the same as in the above described first embodiment of the invention.

Figure 6:
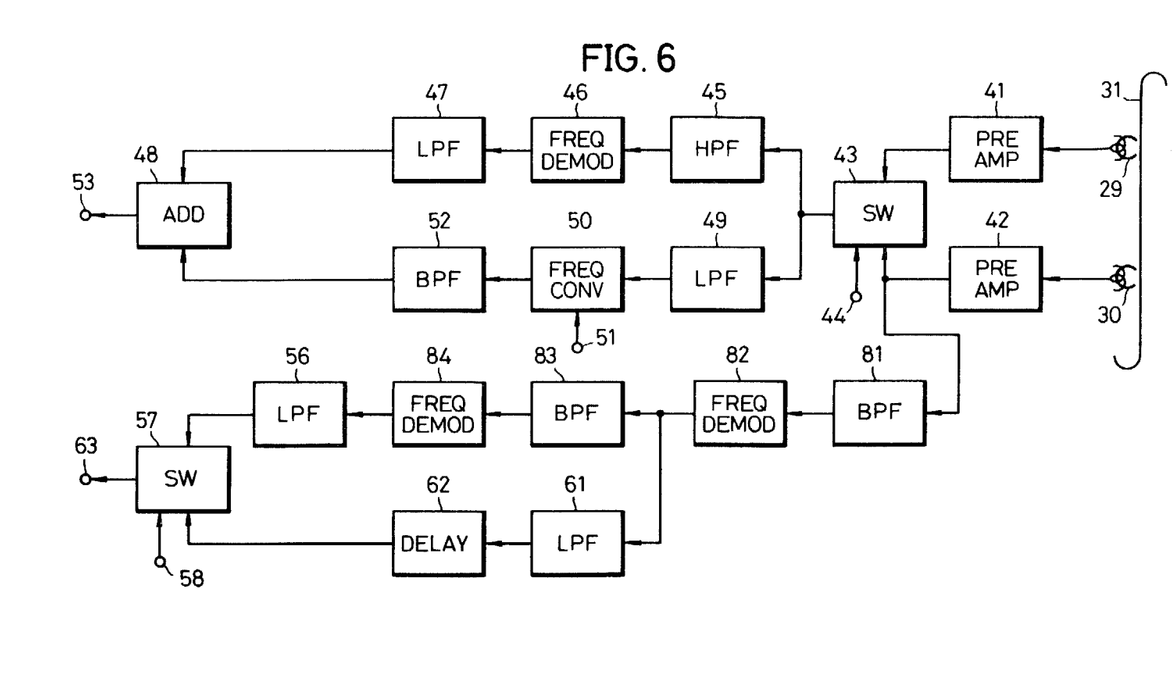

A description will now be given with respect to a reproducing system for reproducing the magnetic tape 31 recorded in the above described manner, by referring to FIG. 6. In FIG. 6, those parts which are the same as those corresponding parts in FIG. 2 are designated by the same reference numerals, and their description will be omitted. The reproducing system for the video signal is the same as in the above described first embodiment of the invention, and its description will be omitted.

Figure 8:
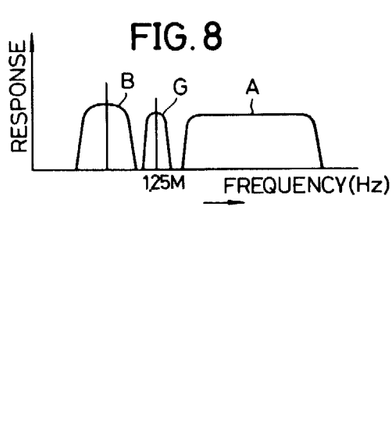

The signal reproduced by the second-channel head 30 is supplied to the switcher 43 through the preamplifier 42, and also supplied to a bandpass filter 81. The bandpass filter 81 has a passing band between 1 MHz and 1.5 MHz. The FM multiplexed audio signal indicated by G in FIG. 8 is thus obtained at this bandpass filter 81. The FM multiplexed audio signal thus obtained is demodulated at a frequency demodulator 82, and restored to the signal in the original frequency spectrum indicated in FIG. 7. This demodulated signal is supplied to a bandpass filter 83 and the lowpass filter 61. The demodulated multiplexed audio signal exists in a manner indicated in FIG. 9(G).

The bandpass filter 83 has a filtering band between 20 kHz and 40 kHz, and the FM delayed audio signal indicated in FIG. 7 is obtained at this bandpass filter 83. The above FM delayed audio signal is demodulated at a frequency demodulator 84, and converted into a delayed audio signal Ia, IIIa, . . . indicated in FIG. 9(H). This delayed audio signal is supplied to the switcher 57 through the lowpass filter 56. On the other hand, the audio signal indicated by F in FIG. 7, that is, the audio signal II, IV, . . . indicated in FIG. 9(I) which is not delayed, is obtained at the lowpass filter 61. This audio signal II, IV, . . . is delayed by an interval of one field at the one-field delay circuit 62, and converted into a delayed audio signal IIa, IVa indicated in FIG. 9(J). This delayed audio signal is supplied to the switcher 57.

The delayed audio signal Ia, IIIa, . . . from the lowpass filter 56 and the delayed audio signal IIa, IVa, . . . from the delay circuit 62 are switched at the switcher 57 according to a switching signal indicated in FIG. 9(K), and are formed into a continuously delayed audio signal Ia, IIa, IIIa, IVa, . . . indicated in FIG. 9(L). This continuously delayed audio signal is obtained from the output terminal 63.

Figure 10:
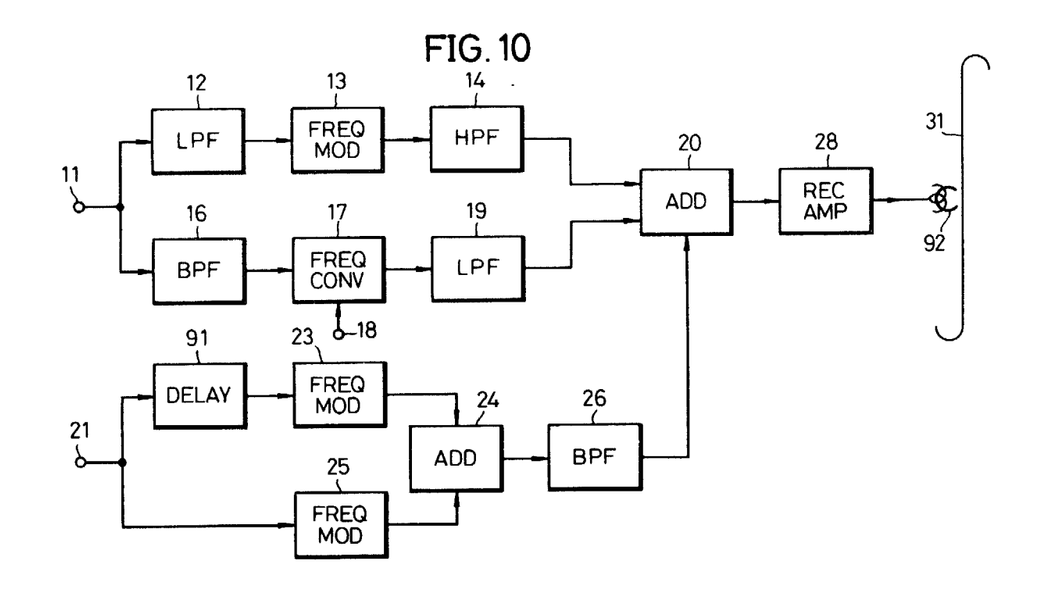
FIGS. 10 and 11 are systematic block diagrams respectively showing a recording system and a reproducing system of a third embodiment of a recording and reproducing system according to the present invention.

Next, a description will be given with respect to a recording system of a third embodiment of a recording and reproducing system according to the present invention, by referring to FIG. 10. In FIG. 10, those parts which are the same as those corresponding parts in FIG. 1 are designated by the same reference numerals, and their description will be omitted.

Figure 12:
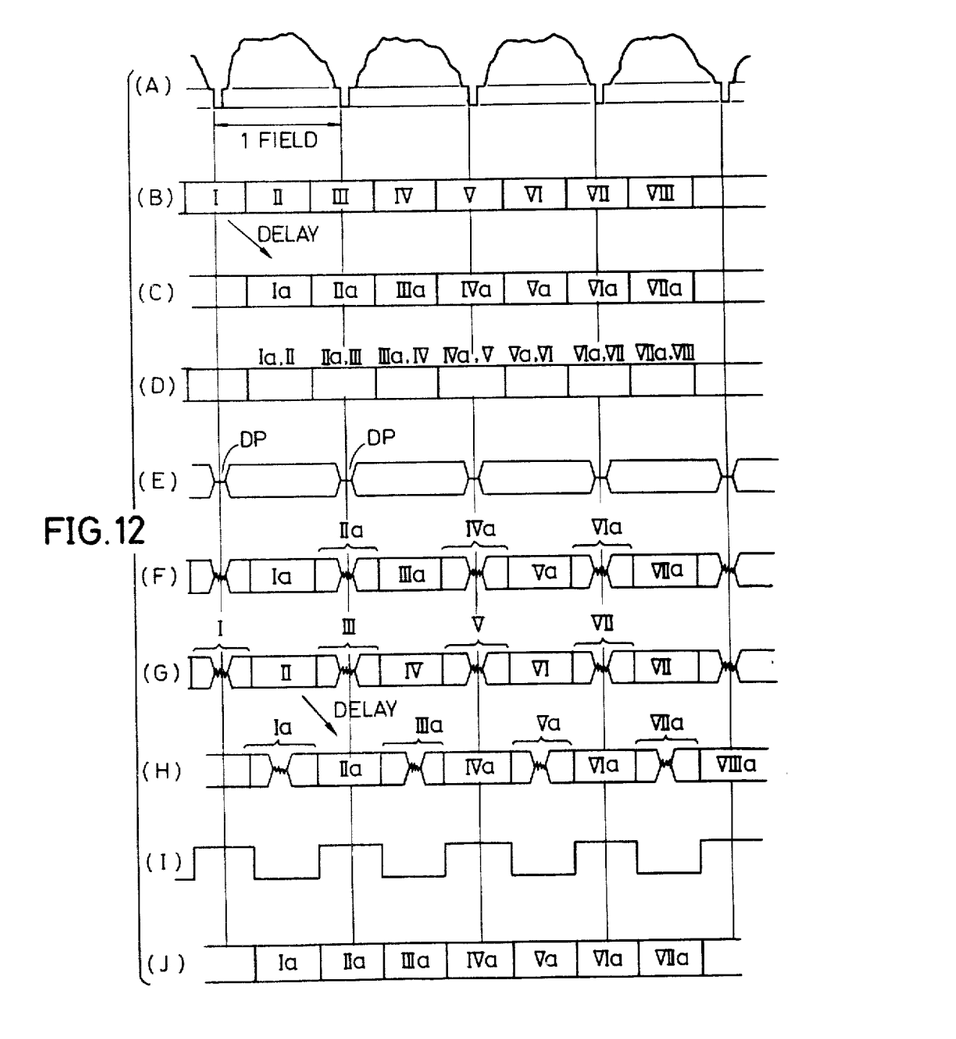

A color video signal indicated in FIG. 12(A) is applied to the input terminal 11, and is subjected to a similar signal processing as in the above first embodiment of the invention. The FM luminance signal A indicated in FIG. 3 is obtained from the highpass filter 14. The frequency-converted carrier chrominance signal B is obtained from the lowpass filter 19. These luminance and chrominance signals are supplied to the adding circuit 20.

On the other hand, The audio signal from the input terminal 21 is delayed by an interval of ¼ field at a ¼-field delay circuit 91. In FIG. 12(B), the audio signal from the input terminal 21 is shown in a state where the audio signal is divided into intervals of ½ field from a position which is shifted by ¼ field from a starting end of one field of the video signal, as I, II, III, IV, . . . . When this input audio signal is delayed by ½ field at the delay circuit 91, an audio signal Ia, IIa, IIIa, IVa, . . . indicated in FIG. 12(C) is accordingly obtained.

The delayed audio output signal of the delay circuit 91 frequency-modulates a carrier at the frequency modulator 23. Hence, the FM delayed audio signal indicated by C in FIG. 3 is supplied to the adding circuit 24. The input audio signal from the terminal 21 is converted into the FM audio signal indicated by D in FIG. 3, at the frequency modulator 25, and then is supplied to the adding circuit 24. The signals C and D (a signal indicated in FIG. 12(D)) added at the adding circuit 24 is supplied to the adding circuit 20 through the bandpass filter 26, and is added with the signals A and B obtained from the filters 14 and 19. The signals A, B, C, and D indicated in FIG. 3 which are added at the adding circuit 20, are supplied to a single rotary head 92 through the recording amplifier 28.

The present embodiment of the invention is an embodiment of a case where the system according to the present invention is applied to the one-head system recording and reproducing apparatus. Only the above single rotary head 92 is provided as the rotary body. The magnetic tape 31 travels in a state where the tape 31 is wound around the guide drum once, in a spiral manner. The head 92 records on an oblique track with respect to the longitudinal direction of the magnetic tape 31, as the head 92 makes a full revolution. However, since only a single head is provided, the head 31 always performs a recording operation with respect to the magnetic tape 31, and the head 92 starts to form a succeeding track after forming one track by tracing the upper and lower end edges of the tape. Accordingly, in this one-head system recording and reproducing apparatus, there is an interval DP in which the signal cannot be recorded and reproduced, which is inevitably introduced with respect to recording and reproducing intervals indicated in FIG. 12(E), when the head 92 traces over the edge of the magnetic tape 31.

The interval in which the head 92 cannot record and reproduce, to introduce signal dropout, is in a range of under approximately 2 milliseconds. Accordingly, it becomes necessary to set the delay time of the above delay circuit 91 in a range between 2 milliseconds and 14 milliseconds. Thus, in the present embodiment of the invention, the delay time of the delay circuit 91 is set to an interval of ¼ field, that is, approximately 8.3 milliseconds.

Figure 11:
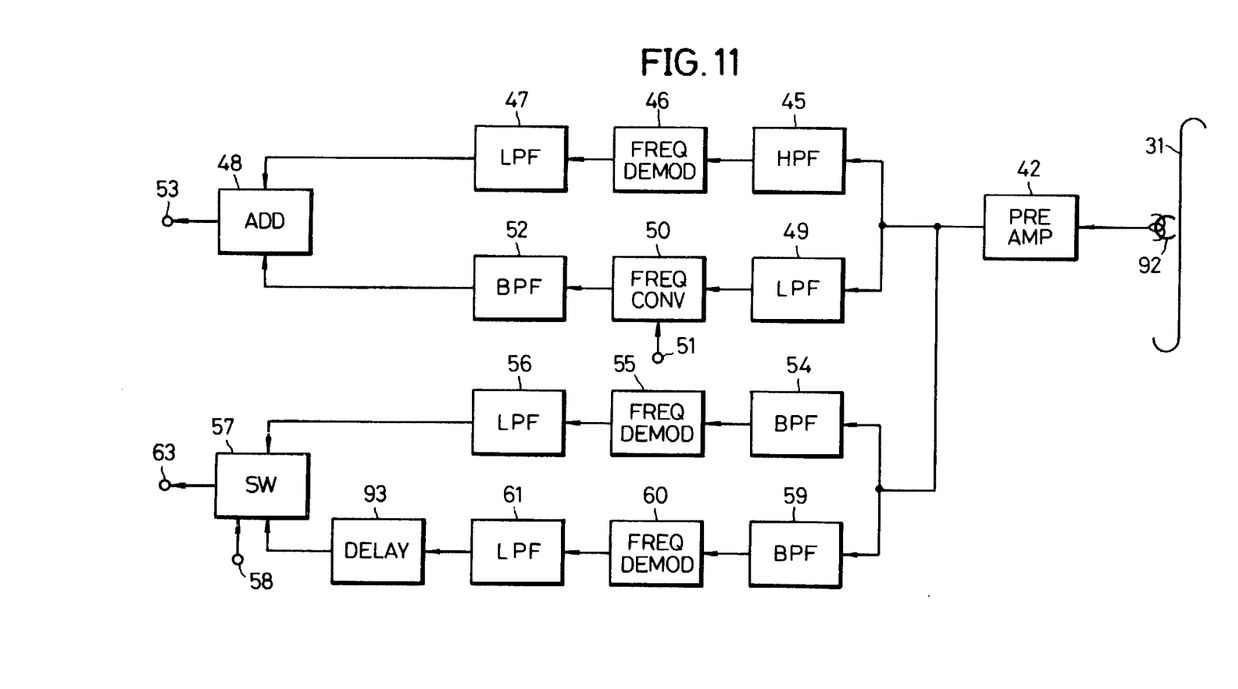

The magnetic tape 31, which is recorded in the above described manner, is reproduced by a reproducing system shown in FIG. 11. In FIG. 11, those parts which are the same as those corresponding parts in FIG. 2 are designated by the same reference numerals, and their description will be omitted.

The signal reproduced from the magnetic tape 31 by the head 92, is supplied to the highpass filter 45, and the lowpass filter 49, through the preamplifier 42. The reproduced signal is also supplied to the bandpass filters 54 and 59 through the preamplifier 42. The reproduced color video signal is obtained from the signal supplied to the filters 45 and 49. The signal processing performed until the signal is finally obtained from the output terminal 53, is the same as in the above described first embodiment of the invention. The reproduced color video signal thus obtained from the output terminal 53, has a compensation for the signal dropout which is made by a conventionally known signal dropout compensation circuit (not shown).

The FM delayed audio signal having a center frequency of 1.2 MHz and obtained from the bandpass filter 54, is demodulated at the frequency demodulator 55. The output of the frequency demodulator 55 is supplied to the switcher 57 through the lowpass filter 56. As indicated in FIG. 12(F), this delayed audio signal is complete for signal intervals Ia, IIIa, Va, VIIa, . . . ; however, it is incomplete for signal intervals IIa, IVa, VIa, . . . since signal dropout is introduced when the head 92 traces over the edge of the magnetic tape 31.

The FM audio signal having a center frequency of 1.4 MHz and obtained from the bandpass filter 59, is demodulated at the frequency demodulator 60. The output of the frequency demodulator 60 is supplied to a ½-field delay circuit 93 through the lowpass filter 93. As indicated in FIG. 12(G), the signal supplied to the above delay circuit 93 is complete for signal intervals II, IV, VI, VIII, . . . ; however, it is incomplete for signal intervals I, III, V, VII, . . . due to signal dropout. This signal indicated in FIG. 12(G) is delayed by an interval of ½ field at the delay circuit 93 and formed into a signal indicated in FIG. 12(H). The signal indicated in FIG. 12(H) is a signal obtained by delaying the entire signal indicated in FIG. 12(G) by an interval of ½ field. Accordingly, signal intervals IIa, IVa, VIa, VIIIa, . . . of the signal indicated in FIG. 12(H) are complete, while signal intervals Ia, IIIa, Va, VIIa, . . . are incomplete. An output signal of the delay circuit 93 is supplied to the switcher 57.

The switcher 57 receives a switching signal indicated in FIG. 12(I) which reverses polarity for every ½ field, through the terminal 58. The switcher 57 accordingly performs a switching operation for every ½ field, by successively switching complete signal intervals Ia, IIIa, Va, . . . of the signal indicated in FIG. 12(F) which is obtained from the lowpass filter 56, and complete signal intervals IIa, IVa, VIa, . . . of the signal indicated in FIG. 12(H) which is obtained from the delay circuit 93. Therefore, a complete signal indicated by Ia, IIa, IIIa, IVa, . . . in FIG. 12(J), having no signal dropouts, is obtained from the output terminal 63 as the reproduced audio signal.

Further, the present invention is not limited to these embodiments, but various variations and modifications may be made without departing from the scope of the present invention.

What is claimed is:

1. An audio signal recording system in an apparatus using a pair of rotary heads for recording a video signal onto a recording tape, said rotary heads having gaps of mutually opposite azimuth angles and alternately recording the video signal on mutually adjacent tracks which are formed obliquely with respect to the longitudinal direction of the tape, said video signal being recorded in uniform increments of a predetermined duration, said audio signal recording system comprising:

delay means for delaying an input audio signal by a predetermined delay time, said predetermined delay time being equal to said predetermined duration of the video signal;

first multiplexing means for multiplexing said input audio signal and a delayed audio output signal of said delay means, to produce a multiplexed audio signal;

second multiplexing means for multiplexing the video signal and the multiplexed audio signal from said first multiplexing means; and recording means using one of a pair of rotary heads for recording only the video signal on the tape, and means using the other of said pair of rotary heads for recording on the tape a multiplexed output signal of said second multiplexing means, so that the video signal and the multiplexed signal containing the video and the multiplexed audio signals are alternately recorded on the tracks on the tape.

2. An audio signal recording system as claimed in claim 1 in which the predetermined duration of said video signal and the predetermined delay time respectively are equal to a duration of one field of the video signal.

3. An audio signal recording system as claimed in claim 1 in which said first multiplexing means comprises first frequency-modulating means for frequency-modulating the delayed audio output signal of said delay means, second frequency-modulating means for frequency-modulating said input audio signal, and adding means for adding and multiplexing outputs of said first and second frequency-modulating means to produce said multiplexed audio signal.

4. An audio signal recording system as claimed in claim 1 in which said first multiplexing means comprises first frequency-modulating means for frequency-modulating the delayed audio output signal of said delay means, adding means for adding and multiplexing an output of said first frequency modulating means and said input audio signal, and second frequency modulating means for frequency-modulating an output of said adding means to produce said multiplexed audio signal.

5. An audio signal recording and reproducing system in an apparatus using a pair of rotary heads for recording and reproducing a video signal with respect to a recording tape, said rotary heads having gaps of mutually opposite azimuth angles and alternately recording and reproducing the video signal onto and from mutually adjacent tracks which are formed obliquely with respect to the longitudinal direction of the tape, said video signal being recorded in uniform increments of a predetermined duration, said audio signal recording and reproducing system comprising:

first delay means for delaying an input audio signal by a predetermined delay time, said predetermined delay time being equal to said predetermined duration of the video signal;

first multiplexing means for multiplexing a non-delayed signal which is said input audio signal and a delayed audio output signal of said first delay means, to produce a mutilplexed audio signal;

second multiplexing means for multiplexing the video signal and the multiplexed audio signal from said first multiplexing means;

recording means using one of said pair of rotary heads for recording only the video signal on the tape, and for recording on the tape a multiplexed output signal of said second multiplexing means by a use of the other of said pair of rotary heads, so that the video signal and the multiplexed signal containing the video and the multiplexed audio signals are alternately recorded on the tracks on the tape;

reproducing means for alternately reproducing from the tape the recorded video signal and the recorded multiplexed signal containing the video and the multiplexed audio signals;

reproduced video signal obtaining means for separating said video signal from the signal which is reproduced from the tape by said reproducing means, to obtain a reproduced video signal;

separating means for separating the non-delayed audio signal and the delayed audio signal of said multiplexed audio signal, from the signal which is reproduced from the tape by said reproducing means;

second delay means for delaying the non-delayed audio signal which is separated in said separating means by a delay time which is equal to the predetermined delay time of said first delay means; and switching means for alternately switching the delayed audio signal which is separated in said separating means and a delayed audio output signal of said second delay means, and for producing a continuous reproduced audio signal.

6. An audio signal recording and reproducing system as claimed in claim 5 in which the predetermined duration of said video signal and the predetermined delay time respectively are equal to a duration of one field of the video signal.

7. An audio signal recording and reproducing system as claimed in claim 5 in which said first multiplexing means comprises first frequency modulating means for frequency-modulating the delayed audio output signal of said first delay means, second frequency-modulating means for frequency-modulating said input audio signal, and adding means for adding and multiplexing outputs of said first and second frequency-modulating means to produce said multiplexed audio signal, and said audio signal recording and reproducing system further comprises:

first frequency demodulating means for frequency-demodulating the frequency-modulated delayed audio signal which is separated in said separating means; and second frequency-demodulating means for frequency-demodulating the frequency-modulated non-delayed audio signal which is separated in said separating means, to supply a demodulated non-delayed audio signal to said second delay means, said switching means alternately switching outputs of said first frequency demodulating means and said second delay means with a period which is equal to the delay time of said second delay means so as to produce a continuous reproduced audio signal.

8. An audio signal recording and reproducing system as claimed in claim 5 in which said first multiplexing means comprises first frequency modulating means for frequency-modulating the delayed audio output signal of said first delay means, adding means for adding and multiplexing an output of said first frequency modulating means and said input audio signal, and second frequency-modulating means for frequency-modulating an output of said adding means to produce said multiplexed audio signal, and said audio signal recording and reproducing system further comprises:

first frequency-demodulating means for frequency-demodulating the frequency-modulated multiplexed audio signal which is separated in said separating means; and second frequency-demodulating means for frequency-demodulating the frequency-modulated delayed audio signal which is separated in said separating means, said switching means alternately switching outputs of said second frequency demodulating means and said second delay means with a period which is equal to the delay times of said first and second delay means so as to produce a continuous reproduced audio signal.

* * * * *